C. Reese,
Fruit Box,
Nº 55,709.   Patented June 19, 1866.
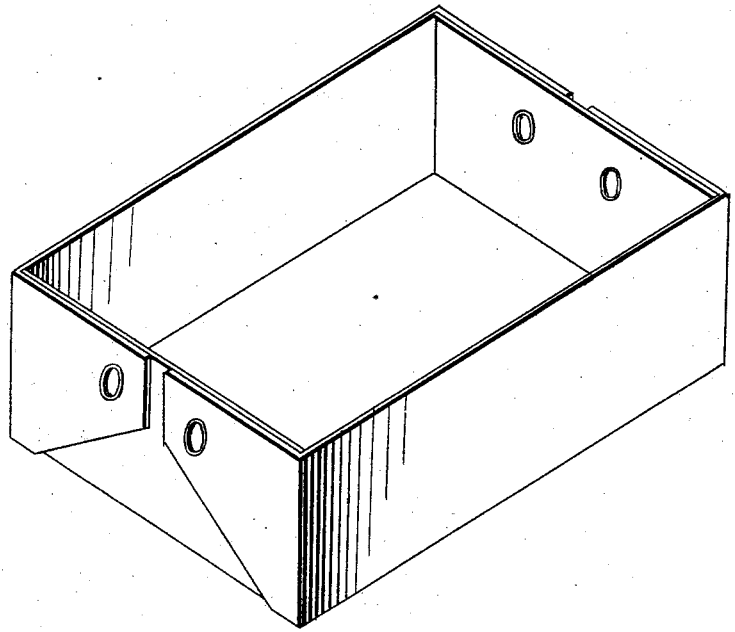
Attest:
W. F. Call
Alex. A. C. Klaueke
Inventor:
Charles Reese
By Munn & Co
Attorneys

UNITED STATES PATENT OFFICE.

CHARLES REESE, OF BALTIMORE, MARYLAND.

IMPROVEMENT IN FRUIT-BOXES.

Specification forming part of Letters Patent No. 55,709, dated June 19, 1866.

*To all whom it may concern:*

Be it known that I, CHARLES REESE, of the city of Baltimore and State of Maryland, have made new and useful Improvements in the Manufacture of Boxes for Fruit and other purposes; and I do hereby declare the following to be a full, clear, and exact description of the nature, construction, and operation of the same, reference being had to the accompanying drawing, which is made part of this specification, and in which my improvement is represented in a perspective view.

The improvement consists in the mode of fastening the sides of the box together.

The sides and bottom of the box are made of one piece, and are bent so as to assume their required positions, in which they are secured by eyelets. The box is made of such size and shape as may suit the purpose designed, and the material will also vary with circumstances.

One principal material and use will be a paper box for fruits—one which will be made so cheaply that it may be sold with the fruit without being returned to the fruit-grower, in which case the buyer will receive his fruit in much better order, as it will not be necessary to transfer the fruit from the box to the vessel of the buyer, who purchases box and all, and takes it home without removing it from the receptacle in which it was brought to market.

The cheapest boxes now in the market for this purpose are so costly as to be worth gathering up and transmitting back to the grower, which occasions a bulky return shipment of empty boxes, which, though cheaper than furnishing such boxes anew, is still an extra charge in the fruit, increasing the expense of placing it in market.

I design to supply boxes at such a very small cost that they may be sold to advantage with the fruit, and having served their purpose be thrown away, and even then constitute a much less charge upon the marketing of the fruit than by the use of any box now in use.

The material may consist of a thin splint or veneer, or of paper, card-board, leather, or fabric, and be made to assume the required proportions and shape, whether as a measure of capacity or of an ornamental form for other uses than the one I have mentioned, where it is supposed to be used but once and then discarded. It may be covered or lined, or both, with suitable material, ornamental or otherwise, colored or embossed, according to the required style, size, purpose, and cost. There are a number of ways of cutting a blank out of a sheet so that when folded up certain laps or ears shall overlap and by attachment form the means of holding the sides in their relative positions to each other and to the bottom. One mode is shown in the drawing, where a rectangular piece, by four cuts and the removal of four corners, which is not a necessity, is prepared for folding up so as to be retained by eyelets. Many other forms will naturally suggest themselves to the mind of a mechanic, which it is needless to attempt to anticipate.

Having thus described my invention, what I claim therein as new, and desire to secure by Letters Patent, is—

A box made of a single piece whose flaps are so bent up as to form sides, which are secured together by eyelets, substantially as described.

CHARLES REESE.

Witnesses:
ALLEN E. FORRESTER,
THOS. W. BERRY.